United States Patent [19]

Yoshida

[11] Patent Number: 5,191,423
[45] Date of Patent: Mar. 2, 1993

[54] TV CHANNEL SELECTING DEVICE WITH A MEMORY

[75] Inventor: Noboru Yoshida, Daito, Japan

[73] Assignee: Funai Electric Company Limited, Daito, Japan

[21] Appl. No.: 690,857

[22] Filed: Apr. 24, 1991

[30] Foreign Application Priority Data

Nov. 28, 1990 [JP] Japan ............................. 2-127461[U]

[51] Int. Cl.⁵ ............................................. H04N 5/50
[52] U.S. Cl. .............................. 358/191.1; 358/194.1; 455/158.1
[58] Field of Search ............... 358/191.1, 192.1, 193.1, 358/194.1, 142; 455/154-159; 340/825.03, 825.25

[56] References Cited

U.S. PATENT DOCUMENTS 4,706,121 11/1987 Young ................................. 358/142
4,959,720 9/1990 Duffield et al. .................. 358/191.1

Primary Examiner—Victor R. Kostak
Attorney, Agent, or Firm—Morrison Law Firm

[57] ABSTRACT

A device for selecting a TV channel in which the names and numbers of the stations are stored in memory in advance. The user selects a program by pressing a key chosen by number or by character. In response to the user's choice of an initial letter, the device displays, individually or in a list, the whole name of the program or station so the user can choose a desired one.

10 Claims, 5 Drawing Sheets

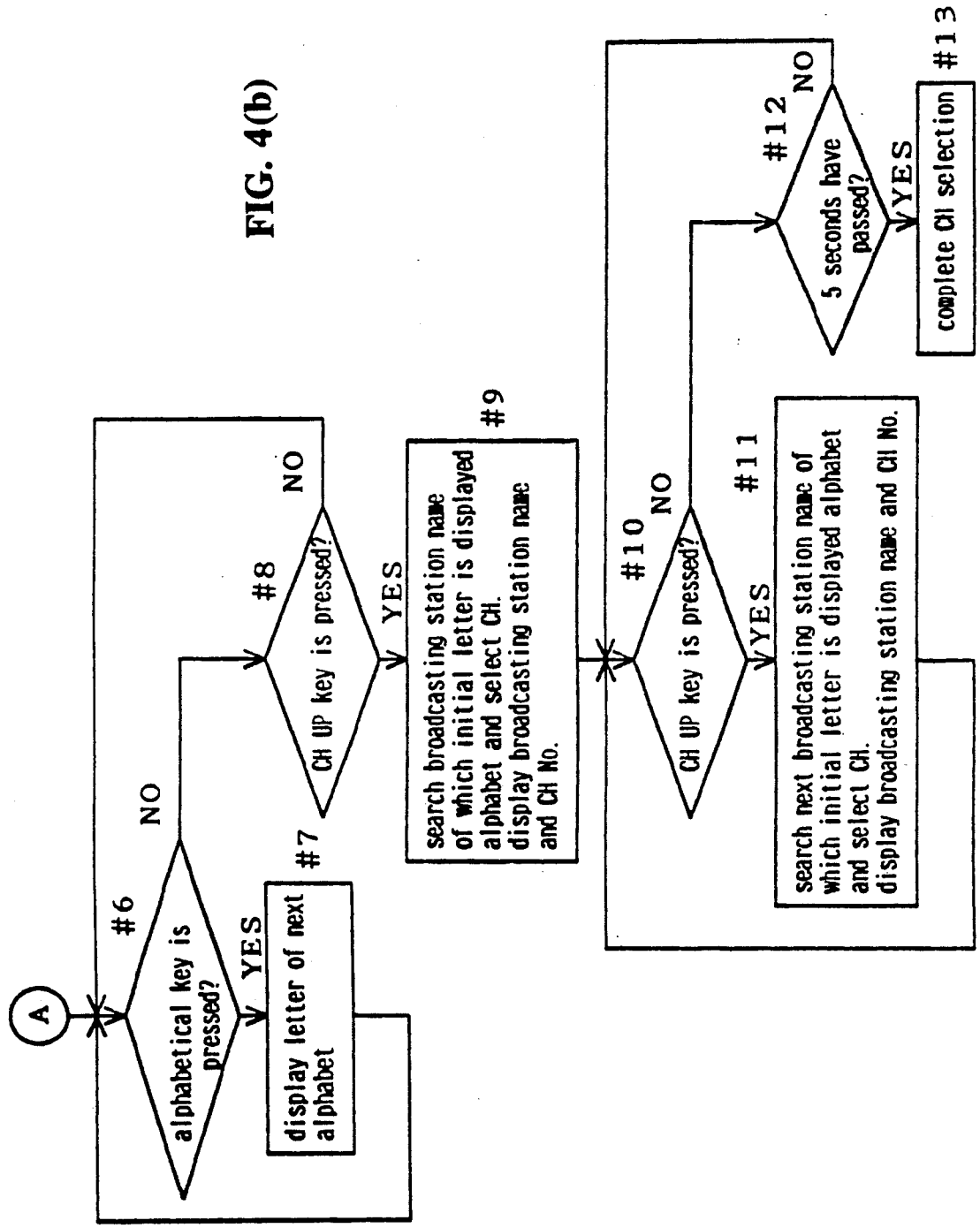

TV CHANNEL SELECTING DEVICE WITH A MEMORY

BACKGROUND OF THE INVENTION

The present invention relates to a channel selecting device in which a channel is selected by displaying the name of a broadcasting station and a channel number thereof on a display device.

It is conventionally known that a television receiver in which a channel number selected by a user is displayed on a display device such as cathode ray tubes and the like. In such a television receiver, it is necessary for the user to know exactly the channel number of the broadcasting station that the user wants to watch.

When the cable television (CATV) having numbers of channels is popularized widely, the number of channels is increased and dozens of channels can be received at home. Accordingly, it is difficult for a user to memorize the name of the broadcasting station and the channel number thereof exactly and select a channel using the channel selecting method of a conventional television receiver. Further, the convenience of a direct channel selecting method using Phase Locked Loop (PLL) in which a channel number is input with a number key is reduced.

SUMMARY OF THE INVENTION

An object of the present invention is to provide a channel selecting device with which a user can display the name of a broadcasting station on a display screen with easy operation and select a desirable channel number easily by just memorizing an initial letter of the name of the broadcasting station even when the user does not memorize the channel number of the broadcasting station.

In order to achieve the above-mentioned object, the channel selecting device according to the present invention comprises display means for displaying a number and a character, a tuner for selecting a channel in a television broadcasting, memory means for storing in advance a plurality of names of broadcasting stations and channel numbers thereof, input means for inputting data of channel selections consisting of a number key or a character key, control means for outputting a signal, based on the data of channel selection input from the input means to display a name of broadcasting station and a of channel number, both of which correspond to the data on the display means, and for outputting a signal for channel selection to the tuner, and channel selecting mode setting means for setting either of channel selecting mode in which channel selection is carried out by a name of broadcasting station or a channel number in the control means.

In the above structure, a name of the broadcasting station and a channel number thereof are stored in advance in memory means. Further, a channel selecting mode in the control means is set to the mode in which a channel is selected by a name of broadcasting station by operating the channel selecting mode setting means. In this mode, the initial letter of the name of the broadcasting station of which a user desires to select is input into the control means by operating a number key or a character key of the input means. Then, all of the names of the broadcasting stations in which the input initial letter is included can be displayed on the display means in order or in a list, and the signal for channel selection is output to the tuner. Accordingly, the user can easily select a desired channel while recognizing the displayed name of the broadcasting station. Further, when the channel selecting mode is set to be a mode in which a channel is selected with a channel number, the user can select a channel usually by operating a number key of the input means.

DESCRIPTION OF THE PREFERRED EMBODIMENT

An embodiment of the present invention will be now described with reference to the drawings.

Figure 1:
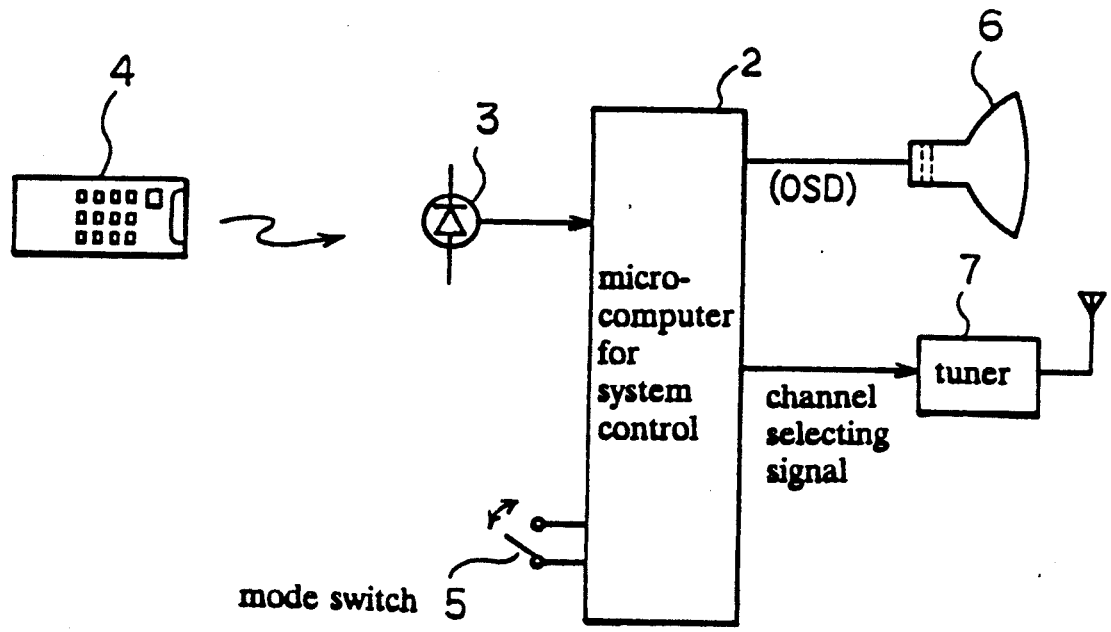
FIG. 1 is a block diagram showing a structure of one embodiment of a television receiver which provides a channel selecting device according to the present invention.

FIG. 1 is a block diagram showing the structure of a television receiver which provides a function of channel selection on a screen. A television system 1 provides a microcomputer 2 for controlling a system. The microcomputer 2 operates the system based on the instruction of the user and receives a signal to select a channel through a receiver 3 for remote control. The user's instruction is sent from a transmitter 4 for remote control.

The remote control transmitter 4 provides a number key and a character key and the like to input data for selecting a channel. In this embodiment, the remote control receiver 3 and the remote control transmitter 4 are a wireless system using infrared rays, while a system with wire and a system in which data are input directly from an operational switch provided in the television body (not shown) may be adapted.

The microcomputer 2 receives a signal which changes a mode of channel selection from a mode switch 5. The mode switch 5 changes between two modes, in which a channel is selected by the name of a broadcasting station when the switch is ON, and a channel is selected by a channel number when the switch is OFF.

The television system 1 comprises a display 6 using a cathode ray tube, liquid crystal display and the like for displaying images, numbers and characters, and a tuner 7 for selecting a television broadcasting channel. The microcomputer 2 outputs an ordinary image signal and a signal, based on a channel selection data input from the remote control receiver 3, for displaying the name of a selected broadcasting station and a channel number thereof on the screen which corresponds to the data. The microcomputer 2 outputs the signal for selecting a channel to a tuner 7. The microcomputer 2 provides memory means for storing in advance a plurality of names of broadcasting stations and channel numbers.

Figure 2:
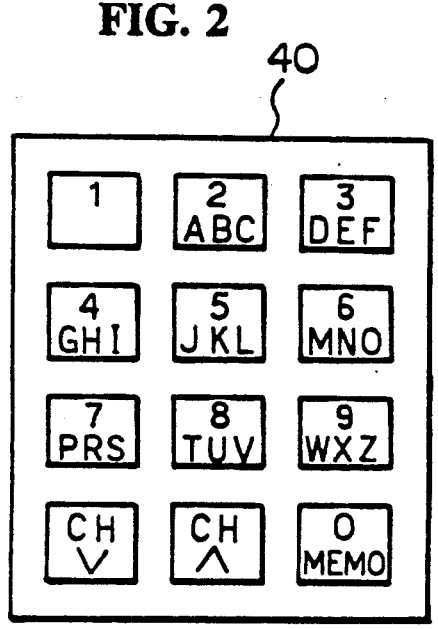
FIG. 2 is a plain view of a remote control.

FIG. 2 shows a plurality of remote control keys 40 on the remote control transmitter 4. As shown in the drawing, numeral and alphabetical keys are both used by adapting numerals from "0" to "9" to alphabet letters in the plurality of keys 40 on the remote control transmitter. For instance, if the mode in which a channel is selected by the name of a broadcasting station, and the key of "2" is pressed, the result is the same as when the key of "A" is pressed. When the key of "2" is pressed twice in succession, the result is the same as when the key of "B" is pressed. Further, when the key of "2" is pressed again continually, it is the same in the case that the key of "C" is pressed. The "CH" key is for channel up or down.

Figure 3:
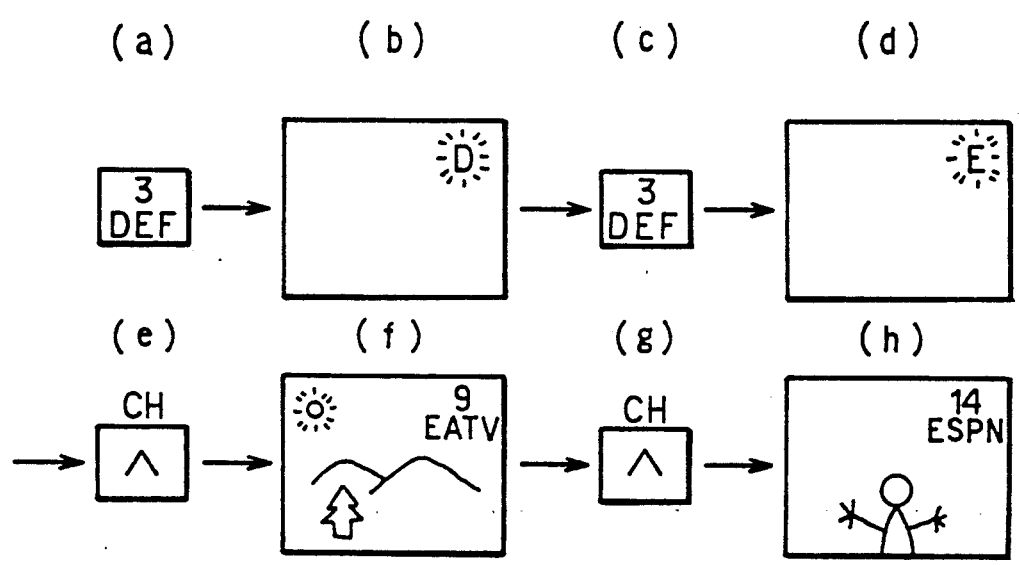
FIG. 3 is an explanatory view showing an operation of the device.

FIG. 3 shows the procedure for operation of the channel selection in which, when the mode of channel selection is by the name of a broadcasting station. The data for selecting a channel is input to the microcomputer 2 in the television system 1 by operating the remote control keys 40. When a mode of channel selection is the name of a broadcasting station, remote control keys 40 are changed to alphabetical keys.

Suppose there is a broadcasting station named "ESPN" specializing in sports programs, whose channel number is "14," and a user wants to select the "ESPN" channel; Suppose also that the user only knows an initial letter "E" of the stations name but can not remember the channel number. First, the user presses the key of "3" including "E" (FIG. 3a). Then, "D" is displayed on the screen of the display 6 (FIG. 3b). When the same key of "3" is pressed again continually (FIG. 3c), "E" which is the next alphabetical character after "D" is displayed (FIG. 3d). In this condition, by pressing the "CH" key for channel up (FIG. 3e), the name of the broadcasting station whose initial letter is a character "E," such as "EATV" of channel 9, is displayed on the screen (FIG. 3f). When the "CH" key for channel up is pressed again continually (FIG. 3g), "ESPN" of 14 channel is displayed on the screen (FIG. 3h). In this manner, the user can select a desired broadcasting station.

Figure 4A:
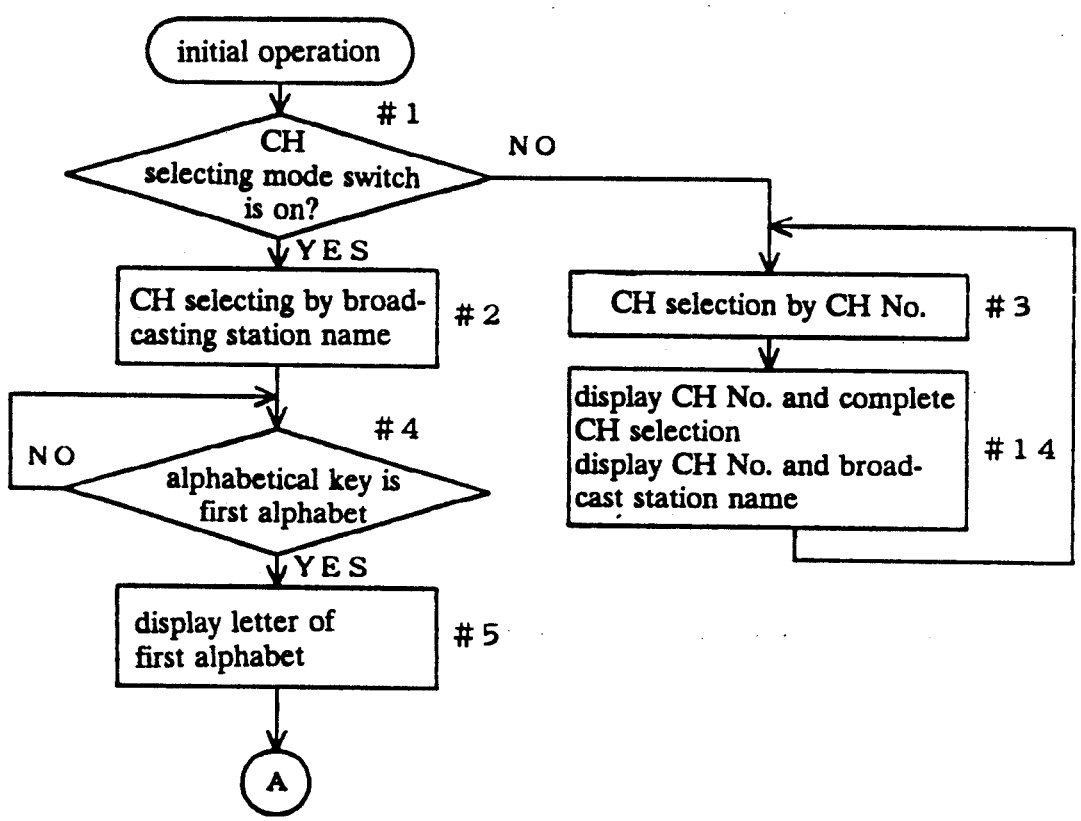
FIGS. 4(a) and (b) are flow charts showing an operation.

Now, an operation of the microcomputer 2 provided in the television system 1 will be described with reference to flowcharts of FIGS. 4(a) and (b).

First, it is detected whether or not the channel selecting mode switch 5 is ON (step #1). When the switch is ON, the channel is selected by a broadcasting station name, and when the switch is OFF, the channel is selected by a channel number. When a channel selection mode in which a channel is selected by a broadcasting station name is set (step #2), and the remote control keys 40 are pressed (step #4), the first letter of the alphabet on the key cap is displayed on the screen (step #5). When the key is pressed again (step #6), the next letter of the alphabet is displayed (step #7), then the same operation is repeated.

In this condition, when the "CH" key for channel up is pressed (step #8), the microcomputer 2 searches the broadcasting station name whose initial letter is included in the displayed alphabet, selects the channel and displays the broadcasting station name and the channel number thereof (step #9). Further, when the "CH" key channel up is pressed (step #10), the microcomputer 2 searches the next broadcasting station name whose initial letter is included in the displayed alphabet. The microcomputer 2 selects the channel and displays the new broadcasting station name and the channel number (step #11). When 5 seconds have passed in the condition of steps #9 and #10 without the "CH" key being pressed for channel up (step #12), the channel is fixed, and channel selection is completed (step #13).

When a channel selecting mode for selecting the broadcasting station by its name is used, the channel is selected by the channel number (step #3). In this case, the channel number is displayed on the screen, and channel selection is completed. Then the broadcasting station name and the channel number thereof are displayed.

The broadcasting station names having the chosen initial letter are displayed in order on the screen so that the user can select the desired channel even when the user does not know the full name or the channel number of the broadcasting station.

Figure 5:
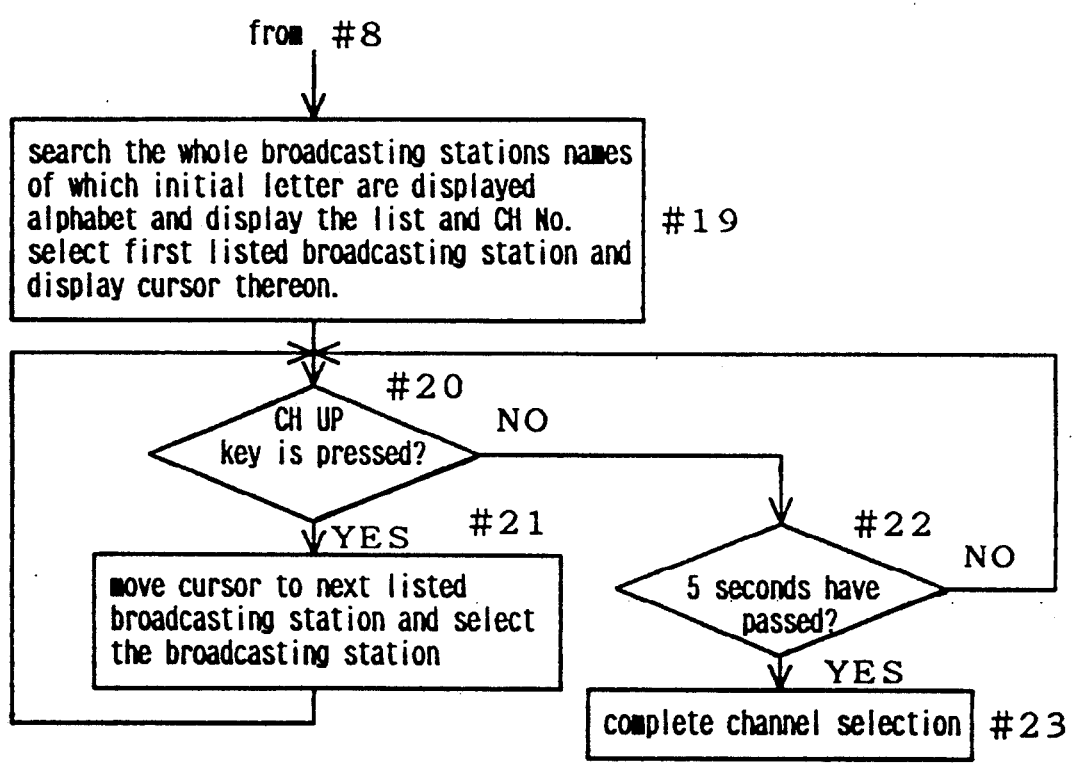
FIG. 5 is a flow chart showing another embodiment of the invention.

FIG. 5 shows a modified embodiment after step #8 in the above-mentioned flow chart. When the "CH" key for channel up is pressed, the step goes to #19 from #8. At step #19, the microcomputer 2 searches the names of the broadcasting stations having the initial letter displayed on the display, displays a list of the broadcasting station names and the channel thereof on the screen, and selects the first broadcasting station on the list, and displays a cursor on the screen. In this condition, when the "CH" key for channel up is pressed again (step #20), the microcomputer 2 moves the cursor to the next listed broadcasting station, then selects the channel thereof (step #21). When 5 seconds have passed (step #22) in the condition of step #19 without the "CH" key being pressed for channel up, the channel is fixed, and the operation is completed (step #23).

According to the above-mentioned embodiment, it is convenient for the user to select a channel among a plurality of broadcasting stations because the names of the broadcasting stations having the selected initial letter are displayed in a list on the screen.

The program may be set so that the names of the broadcasting stations are displayed increasing order of frequency, or in an order with the most desired station first.

While the present invention has been described with reference to the preferred embodiment, many variations and modifications may be made without departing from the spirit of the present invention. In the above embodiment, the channel selecting device is used with a television receiver. It is also applicable to a remote controller in a video tape recorder, for example. In this case, the names of broadcasting stations may be displayed on a display screen of the remote controller.

According to the present invention, the name of a broadcasting station can be displayed on the screen so that a user can confirm and select the channel by the broadcasting station name. Further, by inputting an initial letter of the broadcasting station name, all whole name of the broadcasting stations having this initial letter is displayed. Consequently, even when the user does not know the full name of the broadcasting station and the channel number exactly, a desired channel can be selected easily. Further, the user can avoid the necessity of memorizing channel numbers. The invention is effective when the name of the broadcasting stations and the channel numbers are hard memorize due to the large number of the broadcasting stations in operation.

What is claimed is:

1. A channel selecting device comprising:
    display means for displaying at least a number and an alphabetic character;
    means for selecting a television channel;
    means for presetting a plurality of names of broadcast stations and respective television channels thereof;
    means for storing said plurality of names of broadcast stations and respective television channels thereof;

input means for defining a television channel selection;

said input means including at least one key indicating at least one of a numeral and an alphabetic character, and at least one up or down key;

control means, responsive to said input means, for controlling said display means so as to display a name of one of said broadcast stations and its associated television channel from said means for storing;

said means for selecting being responsive to said control means to select a desired television channel; and mode setting means for making said means for selecting responsive to one of said name of one of said broadcast stations and said associated television channel.

2. A channel selecting device comprising:

display means for displaying at least a number and an alphabetic character;

means for selecting a television channel;

means for storing a plurality of names of broadcast stations and respective television channels thereof;

input means for defining a television channel selection;

said input means including at least one key indicating at least one of a numeral and an alphabetic character, and at least one up or down key;

control means, responsive to said input means, for controlling said display means so as to display a name of one of said broadcast stations and its associated television channel from said means for storing;

said means for selecting being responsive to said control means to select a desired television channel;

mode setting means for making said means for selecting responsive to one of said name of one of said broadcast stations and said associated television channel;

said at least one key includes both one numeral and at least one alphabetic character; and said means for selecting being responsive to said at least one alphabetic character when said mode setting means places said means for selecting in a condition of responsiveness to said name of one of said broadcast stations.

3. Apparatus according to claim 2, wherein:

said at least one alphabetic character includes a plurality of alphabetic characters; and said control means includes means responsive to each repeated actuation, within a predetermined time, of said at least one key for selecting a next alphabetic character of said plurality of alphabetic charaters, whereby names beginning with successive ones of said plurality of alphabetic characters, stored in said means for storing, may be selected.

4. Apparatus according to claim 2, wherein:

said means for displaying displays a first of said names, beginning with said alphabetic character;

said means for displaying is responsive to successive actuation of said at least one up or down key to display successive others of said names stored in said means for storing, beginning with said alphabetic character; and said means for selecting being responsive to said name being displayed following a predetermined period when actuation of said at least one key and said at least one up or down key does not occur.

5. Apparatus according to claim 2, wherein:

said means for displaying being effective for displaying a list of a plurality of said names having the same initial letter.

6. Apparatus according to claim 2, wherein:

said input means includes a keyboard with no more than 12 keys.

7. Apparatus according to claim 2, wherein:

said input means includes a plurality of keys containing both alphabetic characters and numerals; and said keys become alphabetic character keys when said means for selecting is responsive to said name.

8. Apparatus according to claim 7, wherein:

each one of said keys is adapted to a plurality of alphabetic characters; and a one of said alphabetic characters corresponds to a predetermined number of keystrokes on said one key.

9. Apparatus according to claim 2, wherein:

when at least two of said names have a same initial alphabetic character, a keystroke on a one of a channel-up key and a channel-down key cause a one of said names having said same initial alphabetic character to be displayed.

10. Apparatus according to claim 2, wherein:

when at least two of said names have a same initial alphabetic character, said at least two names are displayed on said display means.

* * * * *